(No Model.)
L. MORSE.
SECONDARY BATTERY.
No. 502,824. Patented Aug. 8, 1893.
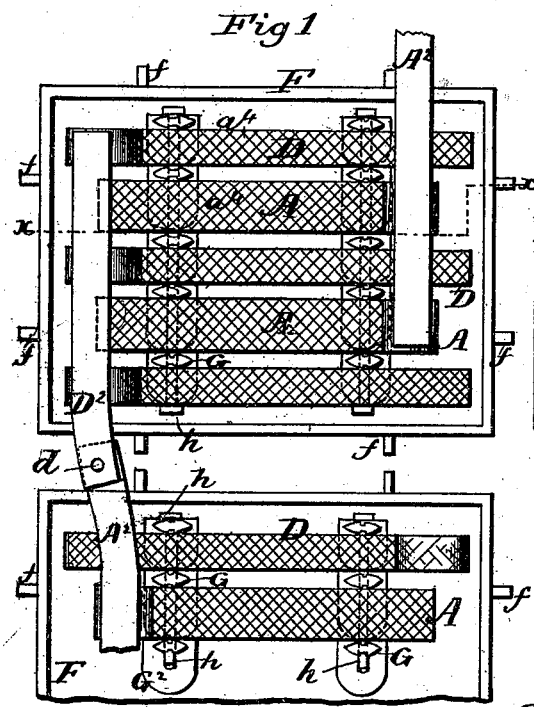
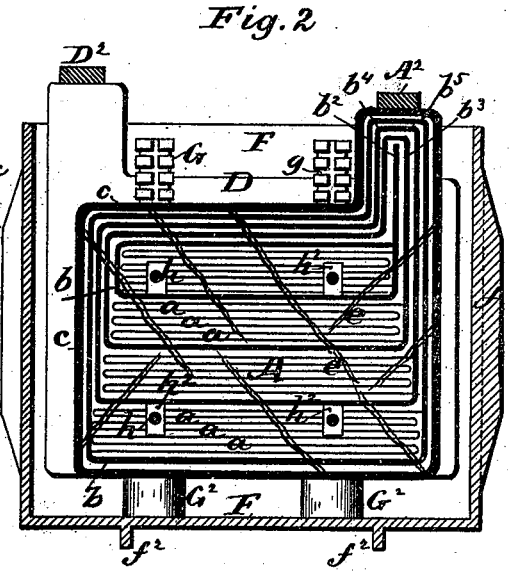
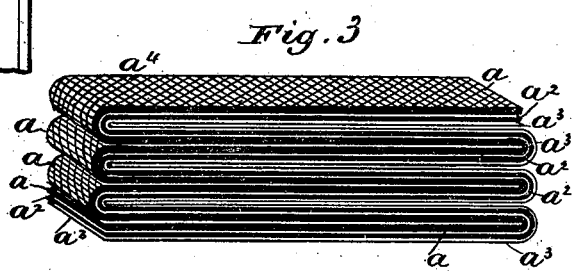
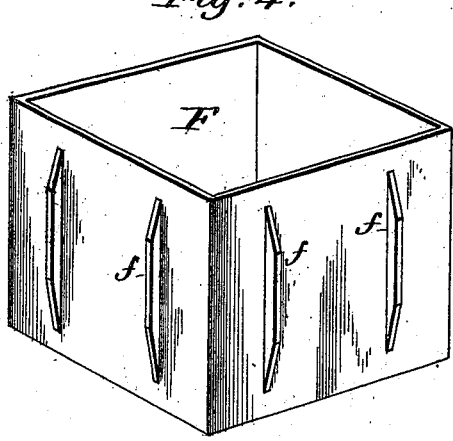
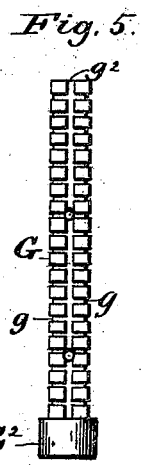
Witnesses:
A. B. Deggis
R. A. Hopper
Inventor:
Lansing Morse,
by E. E. Masson
atty.

UNITED STATES PATENT OFFICE.

LANSING MORSE, OF BROOKLYN, NEW YORK.

SECONDARY BATTERY.

SPECIFICATION forming part of Letters Patent No. 502,824, dated August 8, 1893.

Application filed July 25, 1892. Serial No. 441,118. (No model.)

*To all whom it may concern:*

Be it known that I, LANSING MORSE, a citizen of the United States, residing at Brooklyn, in the county of Kings, State of New York, have invented certain new and useful Improvements in Secondary Batteries, of which the following is a specification, reference being had therein to the accompanying drawings.

My invention relates to that class of batteries which primarily generate no electric current, but which, when submitted to the action of an electric current from a suitable generator, passing through the battery, have their electrodes so acted upon that they are chemically altered or become charged and put into condition to give off currents of electricity upon connecting the poles of the battery by a conductor, and to continue to furnish such currents until the chemical composition of the electrodes has again been altered and a condition of nearly electrical equilibrium is established.

The objects of my improvement are, first, to provide a storage or secondary battery of great electric capacity relatively to its size having its electrodes consisting of narrow strips of lead of different thickness bent upon each other in zig-zag order, the strips of thick lead alternately inclosing the strips of thin lead, and being inclosed by the latter; second, to provide said strips with transverse, diagonal, or double diagonal serrations or ridges upon their surfaces in place of the active material usually placed or made to adhere to the lead plates; third, to provide positive lead-electrodes thicker laterally than the negative electrodes but of less length and height than the latter to provide for the expansion of said positive electrodes while retaining them inclosed between the negative electrodes; fourth, to provide for said electrodes, insulators having laterally projecting feet and grooves for the proper circulation of a liquid upon the entire surface of the lead plates; fifth, to provide the electrode receivers with ridges or ribs on their outer surface to prevent the walls of two contiguous receivers from coming in close contact with each other and also to prevent capillary union and leakage of electricity from one receiver to the other when the acid therein is splashed or overflows their edges. I attain these objects by the construction illustrated in the accompanying drawings, in which—

Figure 1 represents in plan view a battery and a portion of a second battery constructed in accordance with my invention. Fig. 2 is a vertical section of the same in front of one of the positive electrodes, on line $x$ $x$ of Fig. 1. Fig. 3 represents on a larger scale a perspective view of a series of the lead strips of different thicknesses folded zig-zag, one upon the other, and constituting the main portion of each electrode. Fig. 4 is a perspective view of one of the battery-cups or tanks. Fig. 5 is a perspective view of one of the rubber insulators used to separate and support the electrodes.

In my improved battery, each electrode consists of bunches of lead strips cut out of sheet metal of different thicknesses, for example one-twelfth, one-sixteenth, one twenty-fourth, one thirty-sixth, one forty-eighth, one sixty-fourth of an inch. In Fig. 3 the bunch shown consists of only three plates, $a$, $a^2$, $a^3$, of different thicknesses, while in Fig. 1 the bunches of zig-zag-bent and folded strips of different thicknesses are represented in diagram form at $a$. The plates, $a$, $a^2$, and $a^3$, are folded closely against each other, but to permit the circulation of the diluted acid used therewith to penetrate and circulate between said plates, each plate has upon its top and bottom surfaces, a series of grooves or ridges $a^4$ across them preferably diagonally, or cross-diagonally as generally produced on file-blanks. Each bunch is then inclosed in a plate $b$ of preferably greater thickness for example one-tenth of an inch and of sufficient length to have a portion turned up to form a portion of the terminal as shown in Fig. 2, in which the upper or first bunch has a terminal $b^2$ formed of a single thickness of the plate $b$. The plate $b$ inclosing the second bunch, has its terminal $b^3$ inclosing the terminal $b^2$. The plate $b$ inclosing the third bunch, has its terminal $b^4$ inclosing the terminal $b^3$. The plate $b$ inclosing the fourth bunch, has its terminal $b^5$ inclosing the terminal $b^4$. All the plates $b$ and their terminals are inclosed by a thicker binding lead plate $c$, for example one-eighth or three-sixteenths of an inch thick. All the plates and their binders are shown at short distances apart in the positive electrode A of Fig. 2 to clearly show their arrangement, but in practice they are slightly pressed or hammered together to bring them in as close contact as the file-like ridges $a^4$ on their surfaces will permit. The negative electrodes D are constructed in a similar manner as the positive electrodes A, but in Fig. 2 the electrode D is shown only in outline so as to render said figure as clear as possible. The electrodes D are made longer and higher than the electrodes A to overlap the latter and make allowance for the expansion produced in the electrodes A under the action of the electric current to which they are subjected, so that even after they are expanded they are still inclosed or overlapped by the negative electrodes, an odd member of the latter being used for that purpose. The edges of the bunches of plates of which both electrodes are made are fused with a hot iron or other well known means on lines $e$ Fig. 2 made in various directions, to keep them stiffly united and electrically connected together on these lines.

The advantages obtained by making the lead strips of different thickness and having their edges connected as above stated, are, that although the thinner plates become first entirely peroxidized and lose their conductivity, the thicker strips perform that duty for them. The fusing of the edges of the strips together from the thickest outside binding strip to the thinnest inner one, is also to form ridges of metallic lead between said strips (besides strengthening the whole) so that conductivity is maintained with various points of the strips as long as the thickest outside strip contains any metallic lead. The terminals of the positive electrodes are united together by means of lead strips $A^2$ fused to the top of said terminals; and the terminals of the negative electrodes D are united together by means of lead strips $D^2$ fused to the top of said terminals. The lead strips $D^2$ of one battery are united to the strips $A^2$ of the adjoining battery by means of a brass bolt $d$ or other suitable well known means.

To keep the positive electrodes separated from the negative electrodes and also to keep them elevated above the bottom of the glass or other non-conducting receiver F, non-conductor standard insulators are used. They are made preferably of vulcanized rubber and of nearly elliptical form in horizontal cross section and provided with a broad base or foot $G^2$ upon which the electrodes rest; but to permit a circulation of the liquid surrounding said electrodes, each insulator is provided with a series of preferably horizontal grooves $g$ that are intercepted by a vertical groove $g^2$ on the two broad sides thereof. To unite all the electrodes of the battery together, bolts $h$ of rubber or other suitable insulating material are made to pass through horizontal perforations in the sides of the electrodes and perforations in the sides of the insulators. To permit said bolts $h$ not to interfere with the expansion of the positive electrodes, the perforations $h^2$ in the sides of the latter are made of greater height and width than the diameter of the bolts $h$.

To prevent the passage of the electric current between the electrode receivers, or leakage of said current between said receivers when the outer surface of their walls is wet with acid or liquid splashed from said receivers, said outer surfaces are provided with narrow ribs $f$ integral therewith and arranged preferably vertically thereon at points intermediate of the ends and on all its sides, and also with ribs $f^2$ projecting from their bottom. Said ribs also strengthen the walls, and having their ends beveled present but a very small contact surface, even when placed in close juxtaposition against the adjacent receiver.

Having now fully described my invention, I claim—

1. A secondary-battery element or electrode having its body consisting of a series of narrow strips of lead of different thicknesses folded together in zig-zag order substantially as described.

2. In a secondary battery, an element or electrode having its body consisting of a series of narrow strips of lead of different thicknesses folded together in zig-zag order and surrounded by a lead strip having a portion bent upward above said folded strips of different thicknesses substantially as described.

3. In a secondary battery, an element or electrode having its body consisting of a series of narrow strips of lead folded together in zig-zag order and forming a bunch surrounded by a lead strip having a portion bent upward above said bunch, a similarly constituted bunch of strips of lead folded together in zig-zag order, and a strip of lead surrounding both bunches and having a portion bent upward substantially as described.

4. In a secondary battery, an element or electrode having its body consisting of a series of narrow strips of lead of different thicknesses folded together and surrounded by a lead strip having a portion bent upward above said folded strips, the edges of said strips being fused together on narrow lines substantially as described.

5. In a secondary battery, an element or electrode having its body consisting of a series of narrow strips of lead having their surfaces provided with transverse grooves and ridges and folded together and surrounded by a lead strip having a portion bent upward above said folded strips substantially as described.

6. In a secondary battery the combination of the positive electrode having its body consisting of a series of narrow strips of lead folded together in zig-zag order and a strip of lead surrounding the bunch of zig-zag folded strips, and a similarly inclosed bunch of zig-zag folded strips located under the first bunch, with a similarly constructed negative electrode having its ends and top extended beyond the ends and top of the positive electrode substantially as described.

7. In a secondary battery the combination of a positive electrode and a negative electrode with an insulator between them consisting of a standard having a broad foot to support said electrodes, and a series of horizontal grooves in the sides of said standard substantially as described.

8. In a battery the combination of a positive electrode, a negative electrode, and an insulator between them consisting of a standard having vertical grooves, and grooves intercepting them in the sides thereof substantially as described.

9. In a battery the combination of a positive electrode having its body consisting of a series of narrow strips of lead folded together and a strip of lead surrounding the bunch of narrow strips, a similarly constructed negative electrode longer and higher than the positive electrode, grooved standard-insulators between the electrodes, and bolts of insulating material passing through the standard insulators, through the negative electrode; and through the positive electrode, in large perforations substantially as described.

In testimony whereof I affix my signature in presence of two witnesses.

LANSING MORSE.

Witnesses:
LOUIS W. DURSING,
FREDERICK EDER.